United States Patent
Iwata (10) Patent No.: US 9,196,291 B2
(45) Date of Patent: Nov. 24, 2015

(54) CASE, MAGNETIC TAPE LIBRARY APPARATUS AND METHOD OF PREVENTING HOUSED OBJECT FROM FALLING

(75) Inventor: Shinichi Iwata, Tokyo (JP)

(73) Assignee: NEC Corporation, Tokyo (JP)

(*) Notice: Subject to any disclaimer, the term of this patent is extended or adjusted under 35 U.S.C. 154(b) by 1029 days.

(21) Appl. No.: 13/307,275

(22) Filed: Nov. 30, 2011

(65) Prior Publication Data

US 2012/0138619 A1   Jun. 7, 2012

(30) Foreign Application Priority Data

Dec. 6, 2010   (JP) .................................. 2010-271489

(51) Int. Cl.
*G11B 15/68* (2006.01)
*G11B 23/023* (2006.01)

(52) U.S. Cl.
CPC .......... *G11B 15/6885* (2013.01); *G11B 15/682* (2013.01); *G11B 23/0236* (2013.01)

(58) Field of Classification Search
CPC ......... G11B 15/68; G11B 15/682; G11B 5/86
USPC ...................................................... 360/92.1
See application file for complete search history.

(56) References Cited

U.S. PATENT DOCUMENTS

2011/0131782 A1   6/2011   Suzuki et al.

FOREIGN PATENT DOCUMENTS

| JP | 49-21642 | | 6/1974 |
|---|---|---|---|
| JP | 5-120776 A | | 5/1993 |
| JP | 2008062694 A | * | 3/2008 |
| JP | 2010-086578 A | | 4/2010 |

OTHER PUBLICATIONS

Japanese Office Action dated Jun. 11, 2013, with partial English transaction.
Japanese Office Action dated Oct. 16, 2012 with English translation.

* cited by examiner

*Primary Examiner* — Allen T Cao
(74) *Attorney, Agent, or Firm* — McGinn IP Law Group, PLLC (57) ABSTRACT

A case includes a case wall, a locking member and a moving member. The case wall has an opening so as to connect inside and outside of the case. The locking member can move to a locking position set inside the case and to an unlocking position different from the locking position. The moving member can move the locking member from the unlocking position to the locking position when a housed object housed in the case goes outside of the case through the opening.

6 Claims, 9 Drawing Sheets

CASE, MAGNETIC TAPE LIBRARY APPARATUS AND METHOD OF PREVENTING HOUSED OBJECT FROM FALLING

This application is based upon and claims the benefit of priority from Japanese Patent Application No. 2010-271489, filed on Dec. 6, 2010, the disclosure of which is incorporated herein in its entirety by reference.

TECHNICAL FIELD

The present invention relates to a case, a magnetic tape library apparatus and a method of preventing a housed object from falling.

BACKGROUND ART

Figure 11:
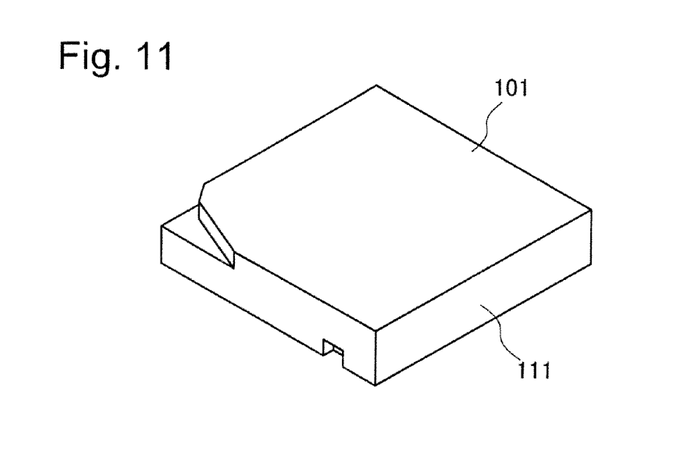
FIG. 11 is a perspective view which shows an example of a housed object.
Figure 12:
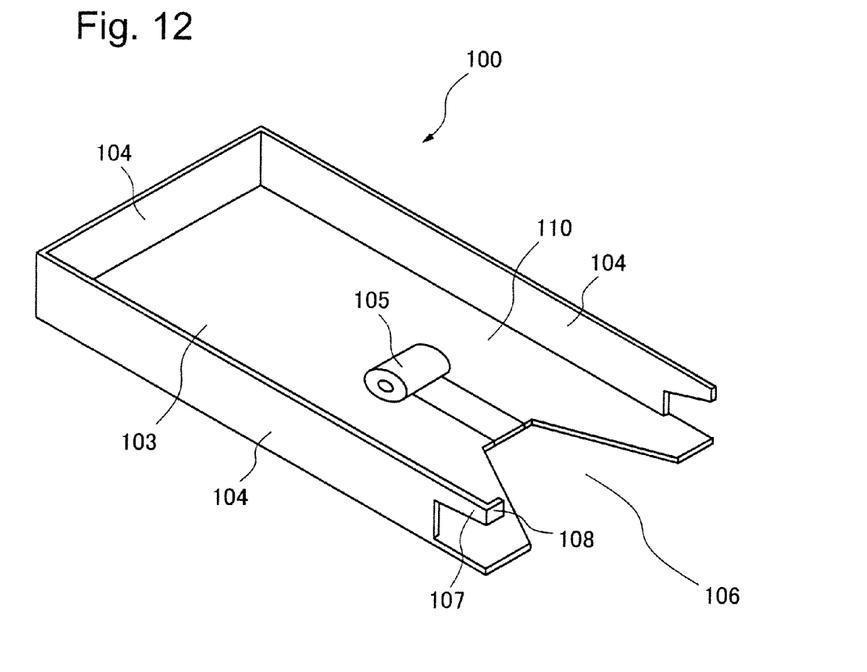
FIG. 12 is a perspective view showing schematically an example of a case which houses the housed object of FIG. 11.

FIG. 12 is a perspective view showing schematically an example of a case which houses a magnetic tape cartridge (see Japanese Patent Application Laid-Open No. 2010-86578). This case 100 is a case which houses a magnetic tape cartridge 101 as shown in FIG. 11. Hereinafter, the magnetic tape cartridge 101 is written also as a cartridge 101 for short.

Figure 13:
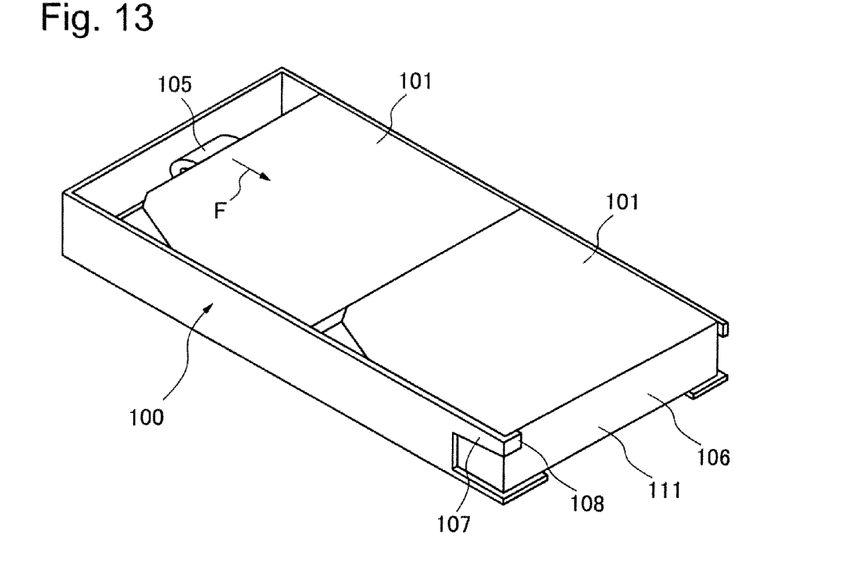
FIG. 13 is a perspective view which represents a state in which the housed object is housed in the case of FIG. 12.

As shown in FIG. 13, this case 100 can house two cartridges 101. As shown in FIG. 12, the case 100 includes a bottom wall 103, a peripheral wall 104 which is installed so that it rises from the bottom wall 103, and a constant force spring 105.

The bottom wall 103 and the peripheral wall 104 form a chamber 110. The chamber 110 is a room (space) which houses the cartridge 101. The size of the chamber 110 is the size that can house two cartridges 101 in a state of lining up them in a direction which goes from an opening 106 described next to the inner side (see FIG. 13).

The opening (insertion and removal opening) 106 is formed on the peripheral wall 104. The opening 106 has a size that allows each one cartridge 101 to go through. The cartridge 101 enters the chamber 110 and goes out of the chamber 110 through the opening 106.

Further, a tongue parts (lever) 107 is formed on the peripheral wall 104 near the opening 106. A stopper 108 is installed in a free end part of the tongue parts 107. This stopper 108 projects toward the opening 106. By deflection of the tongue parts 107, the stopper 108 can move in a direction to retreat from the opening 106.

The stopper 108 locks a back 111 of the cartridge 101, which is arranged inside the chamber 110, in a state of projecting to the opening 106 (see FIG. 13). In other words, the stopper 108 prevents the cartridge 101 from getting out from the chamber 110 through the opening 106.

The constant force spring 105 is installed on the bottom wall 103. The constant force spring 105 gives biasing force to the cartridge 101, which is arranged in the chamber 110, in a direction F toward the opening 106 (refer to FIG. 13). Although the biasing force is given to the cartridge 10) like this, the stopper 108 locks the cartridge 101 as mentioned above. Because of this, even if the constant force spring 105 gives the biasing force to the cartridge 101, the cartridge 101 is prevented from popping out of the case 100.

When the cartridge 101 is taken out from the case 100, first, by operating the tongue parts (lever) 107, the engaged state of the stopper 108 and the cartridge 101 is unlocked. As a result, by the biasing force of the constant force spring 105, a part of the cartridge 101 is pushed out from the opening 106 outside the case 100. Then, as a machine or a person grasps the part of the pushed out cartridge 101 and draws out the cartridge 101, the cartridge 101 can be taken out from the case 100.

Figure 14:
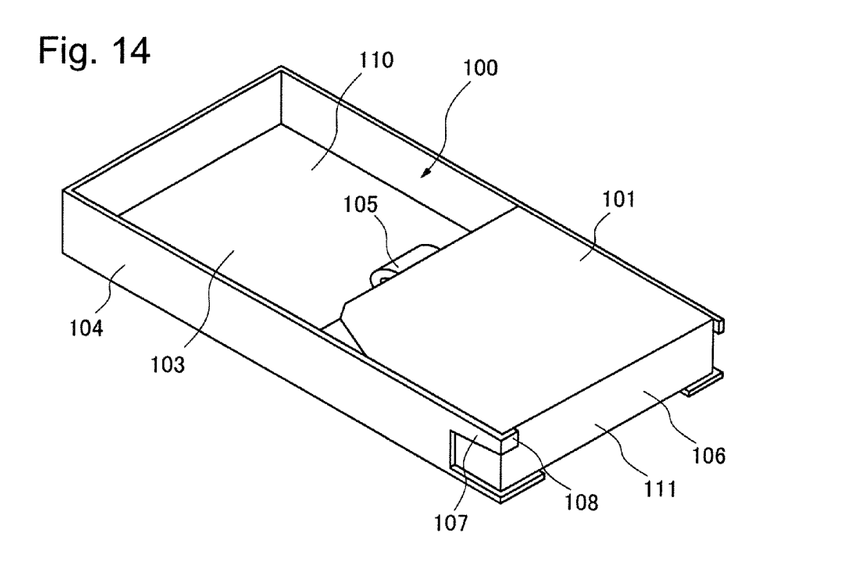
FIG. 14 is a perspective view which represents another state in which the housed object is housed in the case of FIG. 12.

When two cartridges 101 are housed in the case 100, the cartridge 101 in a front side near the opening 106 is taken out as mentioned above. Accompanying the cartridge 101 in the front side moving, as shown in FIG. 14, the cartridge 101 in the inner side moves toward the opening 106 by the biasing force of the constant force spring 105.

SUMMARY

An exemplary object of the present invention is to provide a case and a magnetic tape library apparatus and a method of preventing a housed object from falling, which can prevent another housed object from falling when one housed object is taken out from the case in which a plurality of housed objects are housed.

A case according to an exemplary aspect of the invention includes:

a case wall on which an opening to connect inside and outside of the case is formed;

a locking member that can move to a locking position set inside the case and to an unlocking position different from the locking position; and a moving member that can move the locking member from the unlocking position to the locking position when a housed object housed in the case goes outside of the case through the opening.

A magnetic tape library apparatus according to an exemplary aspect of the invention includes:

a housing in which a case according to claim 1 to house a magnetic tape cartridge as a housed object is arranged, wherein the housing includes a move inhibition member that inhibits a moving member of the case arranged in the housing from moving.

A method of preventing a housed object from falling according to an exemplary aspect of the invention includes:

inside a case which houses the housed object, installing a locking member that can move to a locking position which is set at inner side of a case wall on which an opening so as to connect inside and outside of the case is formed and to an unlocking position different from the locking position; and moving the locking member from the unlocking position to the locking position when the housed object housed inside the case goes outside of the case through the opening.

BRIEF DESCRIPTION OF THE DRAWINGS

Exemplary main features and advantages of the present invention will become apparent from the following detailed description when taken with the accompanying drawings in which.

EXEMPLARY EMBODIMENT

An exemplary embodiment according to the present invention will be described with reference to the drawings below.

(A First Exemplary Embodiment)

Figure 1:
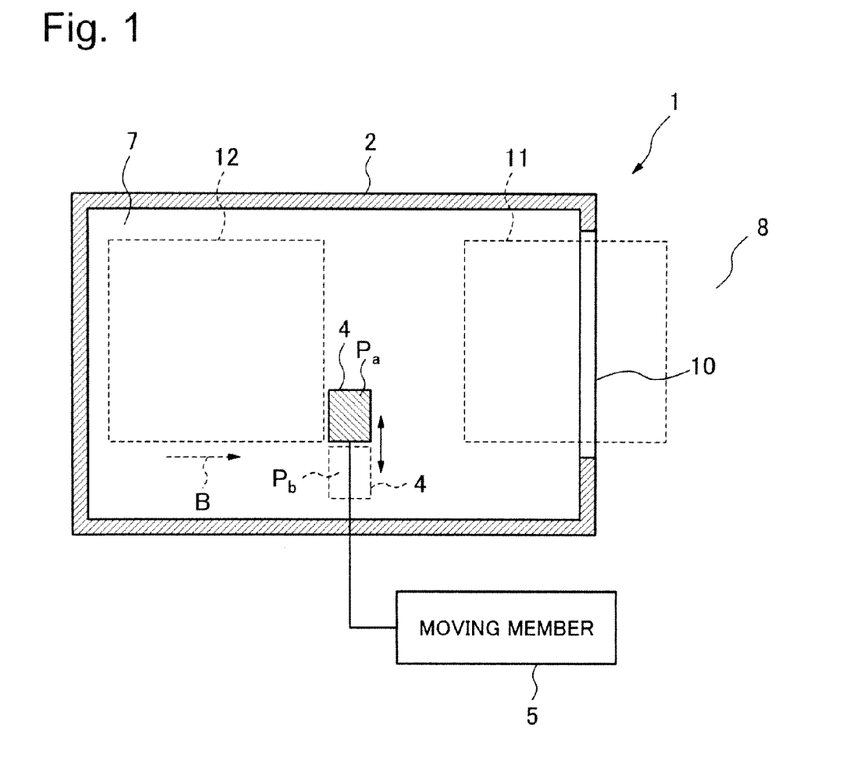
FIG. 1 is a plan view which shows simply a case in the first exemplary embodiment according to the present invention.

FIG. 1 is a plan view which shows simply a case in the first exemplary embodiment according to the present invention. A case (casing, housing, chassis) 1 in this first exemplary embodiment includes a case wall 2, a locking member 4 and a moving member 5. An opening 10 which connects inside 7 and outside 8 of the case 1 is formed on the case wall 2. The locking member 4 can move to a locking position Pa set in advance in the inside 7 of the case 1 and to an unlocking position Pb different from the locking position Pa. When the housed object 11 housed in the inside 7 of the case 1 goes out to the outside 8 of the case 1 through the opening 10, the moving member 5 moves the locking member 4 to the locking position Pa from the unlocking position Pb.

In the case 1 in this first exemplary embodiment, when the housed object 11 is taken out from the case 1, the locking member 4 is moved from the unlocking position Pb to the locking position Pa by the moving member 5. Because of this, even if a housed object 12 different from the housed object 11 tries to move in the direction B toward the opening 10, the locking member 4 locks the housed object 12. As a result, when one housed object 11 is taken out from the case 1 in which a plurality of housed objects 11 and 12 are housed, the case 1 can prevent the housed object 12 different from the housed object 11 from going out to the outside 8 of the case 1 through the opening 10. In other words, when the housed object 11 is taken out, the case 1 can avoid a situation in which other housed object 12 falls down.

In contrast, in the case 100 shown in FIGS. 12 to 14, there is a concern that the housed object (cartridge 101) may fall down as follows. In other words, it is supposed that two cartridges 101 are housed in the case 100. When an operator takes out the cartridge 101 which is near the opening 106 (front side) from this state, the operator operates the tongue parts (lever) 107 so that the engaged state of the stopper 108 and the cartridge 101 is unlocked (so that the stopper 108 becomes in the state retreated from the opening 106). As a result, a part of the cartridge 101 in the front side is pushed out by the biasing force of the constant force spring 105 from the opening 106. And the operator grasps the cartridge 101 and takes it out from the case 100.

At this time, by the biasing force of the constant force spring 105, the cartridge 101 in the inner side moves in the direction to approach the opening 106. Because of this, when the state in which the stopper 108 is retreated from the opening 106 continues successively, the stopper 108 cannot stop the moving cartridge 101 in the inner side. As a result, the cartridge 101 in the inner side is also pushed out from the opening 106 outside the case 100 following the cartridge 101 in the front side. When there is no intention for the operator to take out the cartridge 101 in the inner side, it is likely that he does not think that the cartridge 101 in the inner side comes out. In this instance, the risk is high that a situation in which the operator does not receive the cartridge 101 in the inner side and the cartridge 101 falls down from the case 100 takes place.

In the case 1 in the first exemplary embodiment, as mentioned above, when the housed object 11 (cartridge) is taken out from the case 1, a situation that the other housed object 12 (cartridge) falls down can be avoided.

Figure 2:
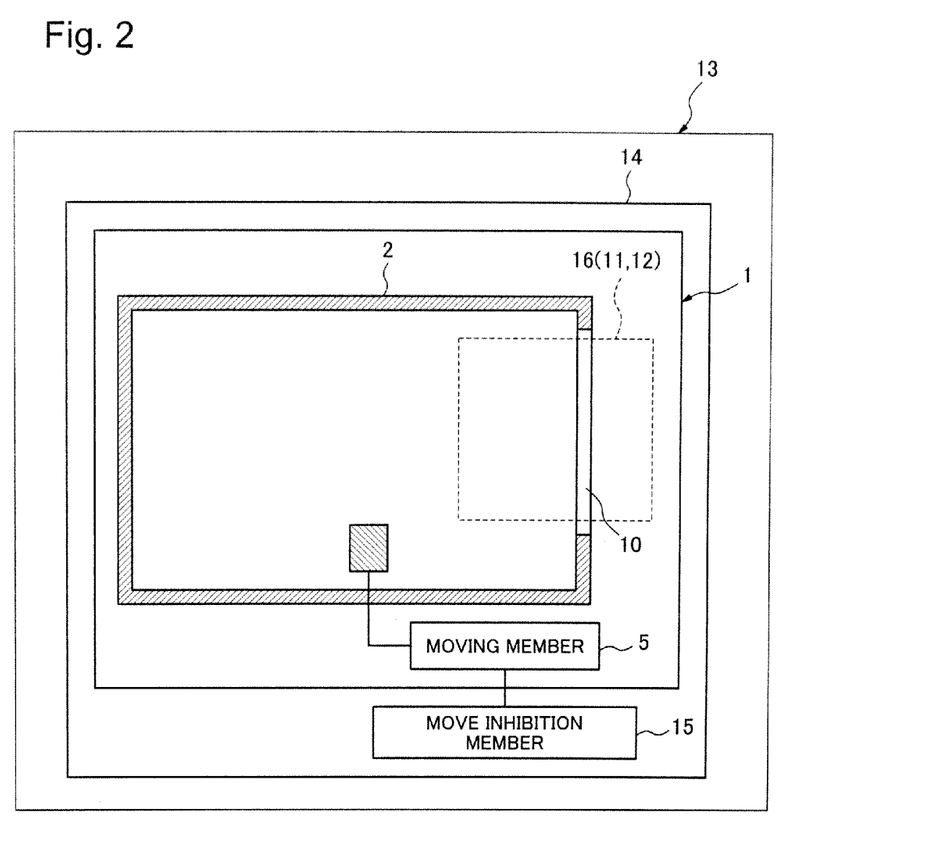
FIG. 2 is a figure which illustrates a structure of a magnetic tape library apparatus in the first exemplary embodiment according to the present invention.

FIG. 2 is a figure which shows simply a magnetic tape library apparatus in the first exemplary embodiment according to the present invention. This magnetic tape library apparatus 13 includes a housing (chassis) 14. The case 1 is arranged inside this housing 14. The case 1 houses a magnetic tape cartridge 16 as the housed objects 11 and 12. A move inhibition member 15 is installed in the housing 14. This move inhibition member 15 inhibits the moving member 5 of the case 1 arranged in the housing 14 from moving.

This magnetic tape library apparatus 13 includes the move inhibition member 15. Because of this, in a state in which the case 1 is arranged in the housing 14, the moving member 5 does not move by the move inhibition member 15. In other words, the locking member 4 does not move. Because of this, when the case I is arranged in the housing 14, it is in the state equivalent to the state in which the case 1 does not have the locking members 4. Therefore, although the case 1 is improved as mentioned above, the magnetic tape library apparatus 13 can effectively use the improved case 1 without performing large design change.

(A Second Exemplary Embodiment)

The second exemplary embodiment according to the present invention will be described below.

Figure 3:
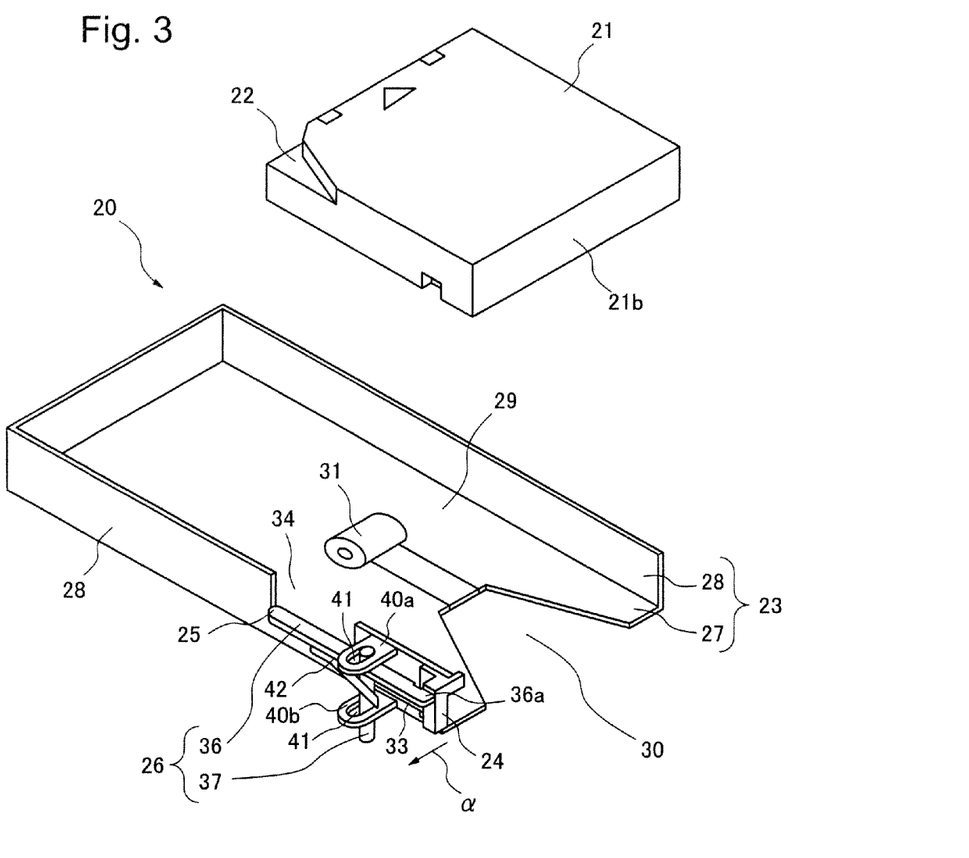
FIG. 3 is a perspective view which represents a case in the second exemplary embodiment according to the present invention together with a housed object.

FIG. 3 is a perspective view which shows simply a case in the second exemplary embodiment together with a housed object. A case 20 in this second exemplary embodiment is a case which houses a magnetic tape cartridge (cartridge) 21 which is a housed object. Further, this case 20 may also be called as a tray or a cell.

In this second exemplary embodiment, the case 20 includes a case wall 23, a first stopper 24, a second stopper (locking member) 25, and an interlocking member (moving member) 26. The case wall 23 includes a bottom wall 27 and a peripheral wall 28 which is installed so as to rise from the bottom wall 27. The bottom wall 27 and the peripheral wall 28 form a chamber 29 which houses the cartridge 21. The peripheral wall 28 includes an opening (insertion and removal opening) 30. The opening 30 has a size and a shape that the cartridge 21 can go through one by one. The peripheral wall 28 includes further an insertion opening 34. The insertion opening 34 is a place where the second stopper 25 goes in and out from outside of the case into inside of the case or in reverse.

In this second exemplary embodiment, the peripheral wall 28 functions as a guide wall which leads (guides) the cartridge 21 from the opening 30 toward the inner side of the chamber 29, or from the inner side of the chamber 29 toward the opening 30.

Figure 4:
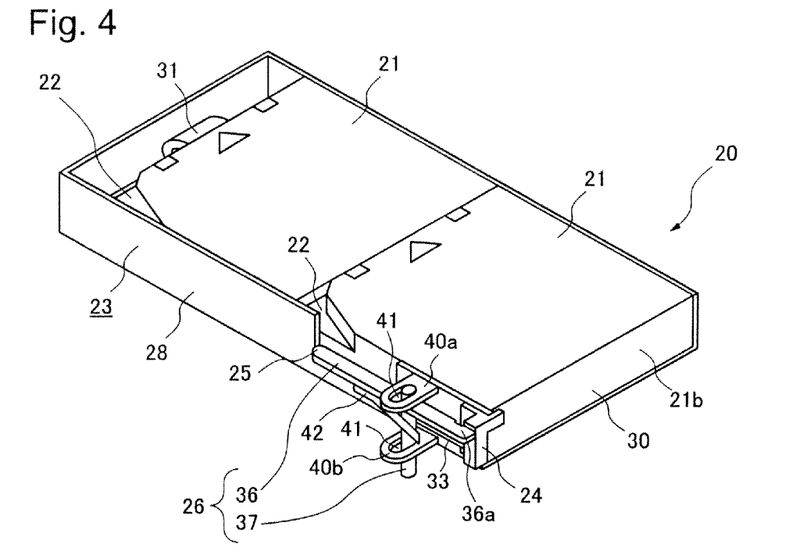
FIG. 4 is a perspective view which shows schematically an example of a state in which the housed object is housed in the case of FIG. 3.

The size of the chamber 29 formed by the peripheral wall 28 and bottom wall 27 mentioned above is the size so that the two cartridges 21 can be housed in line from the opening 30 toward the inner side as shown in FIG. 4.

On an external wall surface of the peripheral wall 28, projections 40a and 40b are formed near the opening 30. The projections 40a and 40b are placed in line through a gap in the direction from the peripheral wall base side that connects to the bottom wall 27 to the peripheral wall top side. The projections 40a and 40b include a through-hole 41 respectively. The shape of the through-hole 41 is an elongated hole shape which is long in the near and far direction for the peripheral wall 28.

One end part of a pressing member 42 is fixed on the external wall surface of the peripheral wall 28. The other end part of the pressing member 42 is arranged in a gap between the projections 40a and 40b. The other end part of the pressing member 42 is a free end part. And the pressing member 42 is composed of material which is possible to deform elastically. Because of this, when power is added to the free end part of the pressing member 42 in the direction that goes away from the peripheral wall 28, it is possible to deform the pressing member 42 elastically. In a state in which the pressing member 42 is deformed elastically in that way, restoring force in the direction to the peripheral wall 28 generates in the pressing member 42.

The projections 40a and 40b and the pressing member 42 configure a holding member which holds the interlocking member 26 on the peripheral wall 28 (case wall 23) as mentioned below.

A constant force spring 31 is installed on the bottom wall 27. This constant force spring 31 gives biasing force to the cartridge 21 housed in the chamber 29 in the direction to the opening 30.

Figure 6A:
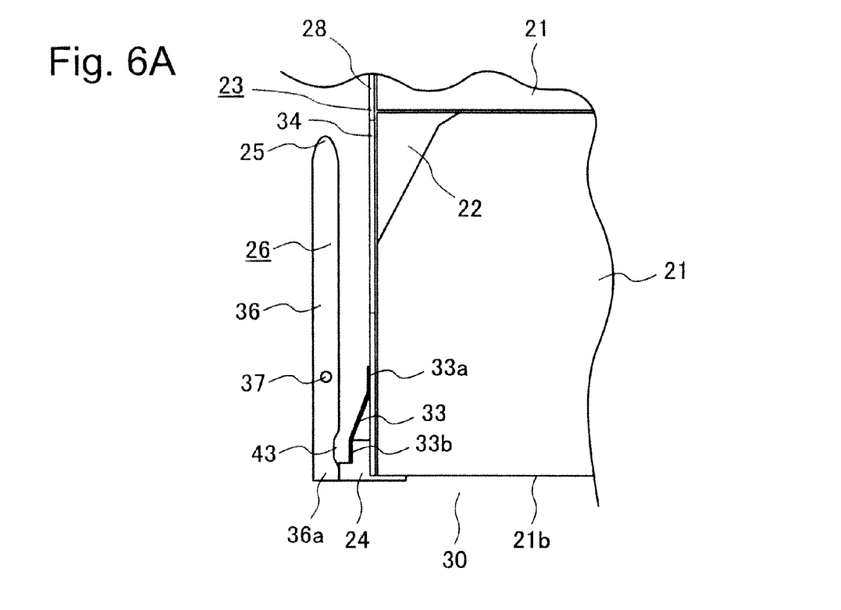
FIG. 6A is a figure which illustrates an example of operation of a first stopper and a second stopper together with FIG. 6B.
Figure 6B:
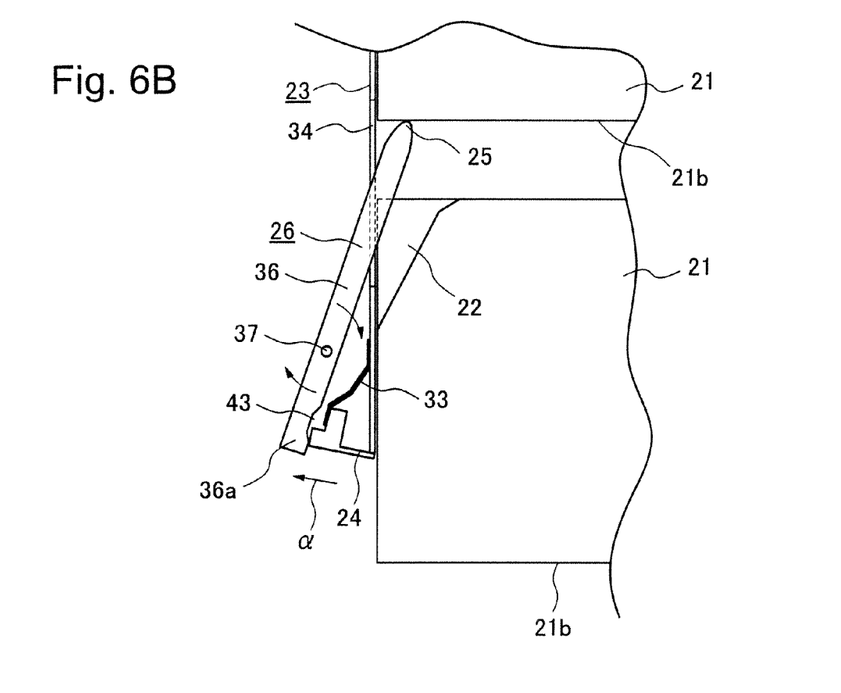
FIG. 6B is a figure which illustrates an example of operation of a first stopper and a second stopper together with FIG. 6A.

The first stopper 24 is arranged so as to project toward the opening 30. FIG. 6A and FIG. 6B are schematic plan views which shows a case part including the first stopper 24 on a situation seeing from the side of the cartridge 21 of FIG. 3. Further, in FIG. 6A and FIG. 6B, the projections 40a and 40b of the peripheral wall 28 and the pressing member 42 are omitted to describe.

As shown in FIG. 4 and FIG. 6A, the first stopper 24 touches a back 21b of the cartridge 21 housed in the chamber 29, and stops the cartridge 21. As a result, the first stopper 24 prevents the cartridge 21 from going out of the opening 30. The first stopper 24 is joined to an attaching member 33. In this second exemplary embodiment, the attaching member 33 is of a narrow plate shape and is possible to deform elastically. One end part 33a of the attaching member 33 (see FIG. 6A) is fixed on the external wall surface of the peripheral wall 28. The other end part 33b of the attaching member 33 is a free end part. The first stopper 24 is joined to the free end part 33b of the attaching member 33.

Figure 5:
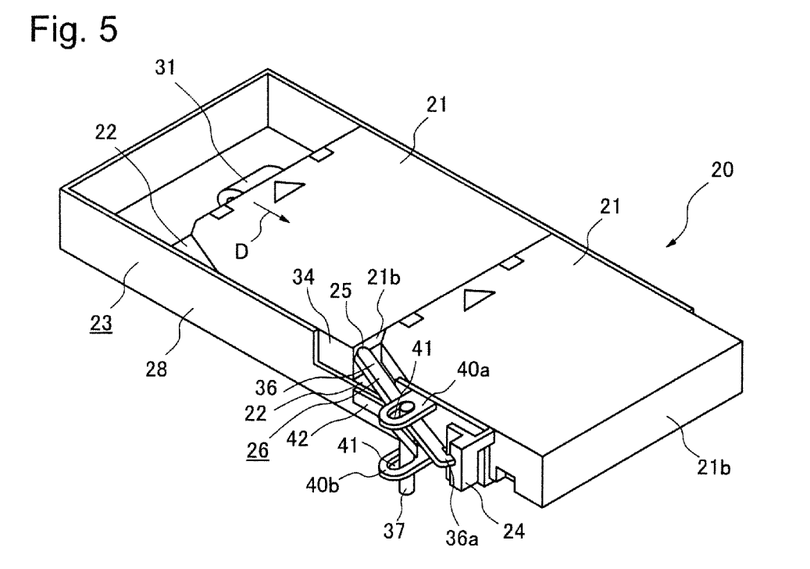
FIG. 5 is a perspective view which shows schematically an example of a state in which a second stopper is interlocked with a first stopper in the case of FIG. 3.

As shown in FIG. 5 and FIG. 6B, when the power in the direction a which retreats from the opening 30 affects on the attaching member 33 and the attaching member 33 bends, the first stopper 24 joined to the attaching member 33 retreats from the opening 30. As a result, the engaged state of the first stopper 24 and the cartridge 21 will be released (unlocked). In this way, when the engaged state is released, the biasing force of the constant force spring 31 pushes out the cartridge 21 arranged near the opening 30 from the opening 30 to the outside of the case 20 (chamber 29). As a result, the cartridge 21 becomes in an easy state to be pulled out from the case 20.

As shown in FIG. 4 and FIG. 5, the interlocking member 26 includes a bar 36 and a shaft member 37. The bar 36 is arranged so as to penetrate the gap between the projections 40a and 40b of the peripheral wall 28. One end part 36a of the bar 36 is a part which compressive force from the first stopper 24 affects. The other end part of the bar 36 functions as the second stopper 25 in this second exemplary embodiment. In other words, the other end part of the bar 36 is integrated with the second stopper 25. Further, There is a state in which the bar 36 and the second stopper 25 is molded as one-piece by a molding technology and so on or a state in which the bar 36 and the second stopper 25 produced separately is bonded by bonding material.

On the bar 36 includes a shaft member (central part of rotation) 37 which is located in a part between the part 36a which is affected by the compressive force from the first stopper 24 and the second stopper 25. The shaft member 37 is inserted in the through-hole 41 of the projections 40a and 40b. As mentioned above, the shape of the through-hole 41 is the elongated hole shape which is long in the near and far direction for the peripheral wall 28. Because of this, by reason of the shape of the through-hole 41, the shaft member 37 (interlocking member 26) can be displaced in the near and far direction for the peripheral wall 28. However, in a state which the restoring force by deforming elastically the pressing member 42 affects on the shaft member 37 (interlocking member 26), the shaft member 37 is pressed and fixed on the peripheral wall 28 by the restoring force. In other words, the projections 40a and 40b and the pressing member 42 configure the holding member which hold the interlocking member 26 on the peripheral wall 28.

When the power affects on the first stopper 24 in the direction a which retreats from the opening 30, the bar 36 receives the compressive force from the first stopper 24 based on the power, rotates on the shaft member 37 from the state of FIG. 6A to the state of FIG. 6B. As a result, the second stopper 25 moves to an opposite direction from the direction moving the first stopper 24. That is, the interlocking member 26 (bar 36) moves the second stopper 25 in connection with the movement of the first stopper 24. Further, in the bar 36, a concave part 43 is formed in a part which receives the compressive force from the first stopper 24. By this concave part 43, the bar 36 can accept the first stopper 24 steadily.

The cartridge 21 has a notch 22 (see FIG. 3, FIG. 4 and so on) in a corner part which becomes the insertion front side when the cartridge 21 is inserted into the case 20. Because of this, as shown in FIG. 6B, rotating in connection with the movement of the first stopper 24, the bar 36 can be inserted in the chamber 29 by reason of the notch 22 without being disturbed by the cartridge 21.

The second stopper 25 moves from the unlocking position shown in FIG. 6A to the locking position in the chamber 29 shown in FIG. 6B through the insertion opening 34 of the peripheral wall 28 when the bar 36 rotates. As a result, the second stopper 25 can stop the cartridge 21 by touching the back 21b of the cartridge 21.

The case 20 of the second exemplary embodiment is structured as mentioned above. In this case 20, as mentioned above, and as shown in FIG. 5, when the first stopper 24 moves in the direction that retreats from the opening 30 (toward unlocking position), by the interlocking member 26, the second stopper 25 moves to the locking position. As a result, when the cartridge 21 which is nearer to the opening 30 is taken out, the cartridge 21 in the inner side is locked by the second stopper 25. Because of this, it is avoided that the cartridge 21 in the inner side falls down from the case 20.

Figure 7:
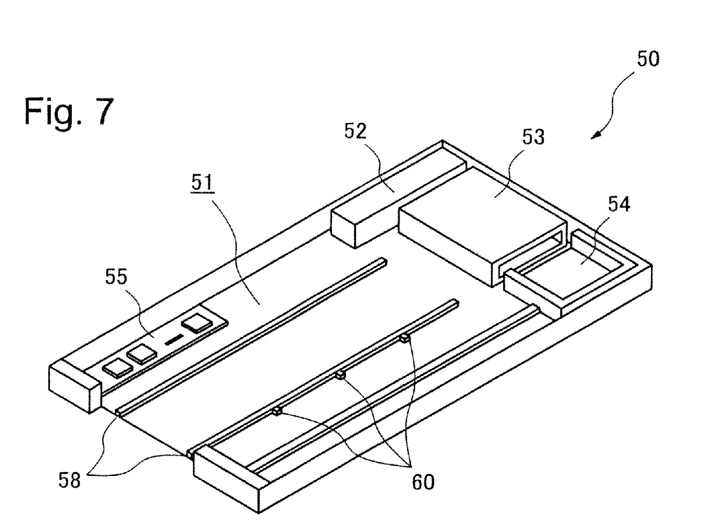
FIG. 7 is a perspective view showing schematically an exemplary embodiment of a magnetic tape library apparatus in which the case of FIG. 3 is arranged.

FIG. 7 is a model figure which shows simply a magnetic tape library apparatus of the second exemplary embodiment according to the present invention. This magnetic tape library apparatus 50 includes a housing (chassis) 51, a power supply 52, a drive apparatus 53, a carrier apparatus (accessor mechanism) 54 and a control base (LCC (Library Control Card)) 55.

Figure 8:
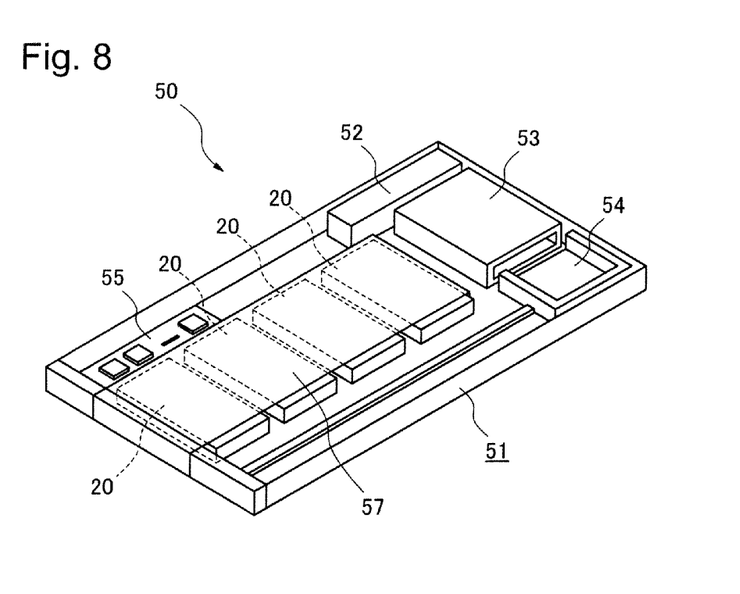
FIG. 8 is a perspective view showing schematically an example of a state in which a case is installed in the magnetic tape library apparatus of FIG. 7.

The magnetic tape library apparatus 50 can accommodate a housing case (magazine) 57 as shown in FIG. 8 so that it can be freely attached or detached. The housing case 57 houses the case 20 of the second exemplary embodiment in a state easy to take out. In an example of FIG. 8, a plurality of cases 20 are housed in the housing case 57.

Figure 9:
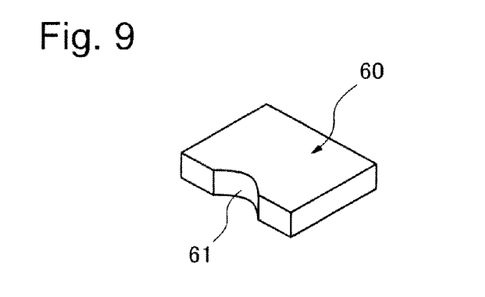
FIG. 9 is a perspective view which shows an example of a move inhibition member installed in a housing of the magnetic tape library apparatus.
Figure 10:
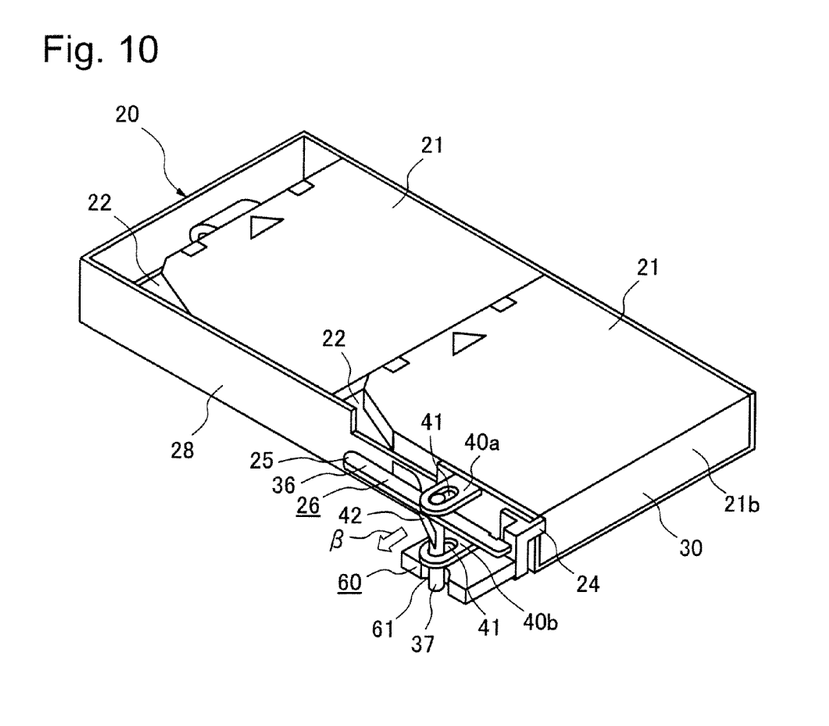
FIG. 10 is a perspective view showing an example of a state in which the second stopper is inhibited from moving by the move inhibition member of FIG. 9.

A guide rail 58 is formed on the housing 51 as shown in FIG. 7. This guide rail 58 is a member which, when the housing case 57 is attached or detached, guides the housing case 57. Further, in the housing 51, a convex member (move inhibition member) 60 is formed. A position where this convex member 60 is formed is apart interacting with the projections 40a and 40b of the case 20 accommodated in the housing case 57 when the housing case 57 is in a state to be installed as shown in FIG. 8 in the set position set in advance. FIG. 9 is a figure which shows schematically an example of one form of the convex member 60. In this example of the form, a concave part 61 is formed on the side of the convex member 60. As shown in FIG. 10, the concave part 61 is a part which receives the shaft member 37 of the case 20.

In this second exemplary embodiment, in the state in which the case 20 (housing case 57) is installed at the set position of the magnetic tape library apparatus 50, the convex member 60 moves the shaft member 37 (bar 36) of the case 20 in the direction $^8$ which goes away from the peripheral wall 28 (refer to FIG. 10) while resisting the elastic force of the pressing member 42. The arranged position of the bar 36 after movement is a position in which, even if the first stopper 24 moves, it does not touch the first stopper 24. Further, the size of the convex member 60 and the length in the longer direction of the through-hole (elongated hole) 41 of the projections 40a and 40b are designed so that it may be possible to move the bar 36 (shaft member 37) to such the position.

By the movement of the bar 36 by reason of the convex member 60, the bar 36 is not interlocked with the first stopper 24. That is, the convex member 60 releases the state in which the first stopper 24 and the second stopper 25 interlock by the interlocking member 26, and maintains this released state. In other words, the convex member 60 is a member which inhibits the movement of the second stopper 25. Also, the holding member including the projections 40a and 40b and the pressing member 42 holds the interlocking member including the bar 36 and the shaft member 37 in a state in which interlocking the first stopper 24 and the second stopper 25 can be released.

The drive apparatus 53 is an apparatus which records or reproduce a magnetic tape (not shown) in the cartridge 21. The carrier apparatus 54 has a function to take out the cartridge 21 from the case 20 in the housing case 57 and carries it to the drive apparatus 53. Further, the carrier apparatus 54 has a function to carry the cartridge 21 to the case 20 from the drive apparatus 53. A control circuit (not shown) formed in the control base 55 has a function to control operation of the drive apparatus 53 and the carrier apparatus 54. The power supply 52 is an apparatus which supplies electric power to the drive apparatus 53, the carrier apparatus 54 and the control circuit of the control base 55. Further, in this second exemplary embodiment, each configuration of the drive apparatus 53, the carrier apparatus 54, the control circuit of the control base 55 and the power supply 52 may adopt a suitable configuration from among the configurations proposed variously, and their description will be omitted.

This magnetic tape library apparatus 50 includes, as mentioned above, the convex member 60 which is a member to maintain the release (unlocking). This convex member 60 can maintain the interlocking released state between the first stopper 24 and the second stopper 25 in the case 20 installed. Because of this, the case 20 in this second exemplary embodiment is, in the state in which it is installed in the magnetic tape library apparatus 50, in the same state where the second stopper 25 and the interlocking member 26 are not installed. As a result, the magnetic tape library apparatus 50 can correspond to the case 20 of the second exemplary embodiment without changing design of the carrier apparatus 54 adapting for the case in which the second stopper 25 and the interlocking member 26 are not installed.

(Other Exemplary Embodiments)

Further, the present invention is not limited to the first and the second exemplary embodiment, and the various embodiments can be adopted. For example, in the second exemplary embodiment, the end part of the bar 36 in the interlocking member 26 functions as the second stopper 25. Instead of this, the second stopper 25 may be structured of a member different from the bar 36. For example, the second stopper may be configured by tongue parts formed out of a part of the peripheral wall 28. That tongue parts (the second stopper) is pressed by the bar 36, inserted inside the case 20, and locks the cartridge 21.

Also, in addition to the structure of the second exemplary embodiment, the case 20 may include the following elastic member. The elastic member is configured of a torsion coil spring and so on, and is installed so as to connect the bar 36 of the interlocking member 26 and the external wall surface of the peripheral wall 28. The elastic member gives to the bar 36 elastic force which moves (returns) the second stopper 25 from the locking position to the unlocking position.

Further, in the second exemplary embodiment, the interlocking member 26 moves the second stopper 25 from the unlocking position to the locking position by interlocking the first stopper 24 moving. Instead of this interlocking member 26, a moving member which moves the second stopper 25 from the unlocking position to the locking position without using the first stopper 24 when the cartridge 21 goes out from the case 20 may be installed.

By the way, if the structure mentioned above (elastic member, for example) that returns the second stopper 25 in the second exemplary embodiment from the lock position to the unlocking position is equipped, in the state in which the case 20 is installed in the magnetic tape library apparatus 50, the state interlocking the first stopper 24 and the second stopper 25 may not be released. Because of this, in such a case, the case 20 may not include the structure which holds the interlocking member 26 so that it can move in the direction that goes away from the peripheral wall 28 (in other words, the structure which can release the state interlocking the first stopper 24 and the second stopper 25).

Further, in the second exemplary embodiment, the case 20 is the size that can house two cartridges 21. In contrast, the case 20 may be possible to house no smaller than three cartridges 21.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A case storage medium comprising:
   a case storage medium wall on which an opening to connect inside and outside of the case is formed;
   a locking member that is movable to a locking position set inside the case storage medium and to an unlocking position different from the locking position; and
   a moving member to move the locking member from the unlocking position to the locking position when a housed storage medium housed in the case storage medium goes outside of the case storage medium through the opening,
   a first stopper that is movable in a forward or backward direction to the opening, wherein
   a second stopper, which comprises the locking member, is movable to the locking position so as to lock an other housed storage medium moving in the direction to the opening different from the housed storage medium, and to the unlocking position so as to unlock an engaged state with the other housed storage medium, and
   the moving member comprises an interlocking member which, when the first stopper retreats from the opening, interlocks the first stopper and moves the second stopper from the unlocking position to the locking position.

2. The case according to claim 1, wherein
   the interlocking member includes a central part of rotation that is placed between a part with which the first stopper is integrated or is in contact and a part with which the second stopper is integrated or is in contact,
   when the first stopper moves from the opening in the backward direction, the interlocking member rotates on the central part of rotation, and moves the second stopper from the unlocking position to the locking position by moving the second stopper in a reverse direction of a direction to which the first stopper moves.

3. The case according to claim 1, further comprising:
   a support member that supports the interlocking member on the case wall so that a state which the first stopper and the second stopper interlock can be released.

4. The case according to claim 1, wherein
   the unlocking position of the locking member is set outside the case storage medium,
   an insertion opening to insert the locking member inside the case storage medium is formed on the case wall.

5. A magnetic tape library apparatus comprising:
   a housing in which a case storage medium according to claim 1 to house a magnetic tape cartridge as a housed storage medium is arranged, wherein
   the housing includes a move inhibition member that inhibits a moving member of the case storage medium arranged in the housing from moving.

6. A method of preventing a housed storage medium from falling comprising:
   inside a case which houses the housed storage medium, installing a locking member that is movable to a locking position which is set at inner side of a case wall on which an opening so as to connect inside and outside of the case is formed and to an unlocking position different from the locking position; and
   moving the locking member from the unlocking position to the locking position when the housed storage medium housed inside the case goes outside of the case through the opening.

* * * * *